UNITED STATES PATENT OFFICE.

EDWARD DUGDALE, OF GRIFFIN, GEORGIA.

IMPROVEMENT IN COFFEE SUBSTITUTES.

Specification forming part of Letters Patent No. 143,890, dated October 21, 1873; application filed October 13, 1873.

*To all whom it may concern:*

Be it known that I, EDWARD DUGDALE, of Griffin, in the county of Spalding and State of Georgia, have invented a Process of Preparing the Seed of the Persimmon, *Diospyros Virginiana*, for use as the base or constituent element of a beverage, of which the following is a specification:

My invention relates to a process hereinafter described by which the seed of the persimmon taken in its raw state is chemically changed, so as to admit of its being ground, disintegrated, or otherwise reduced, and an infusion, decoction, distillate, or essence made therefrom having the taste or appearance of an infusion or decoction of the ordinary coffee-berry. The object of my invention is to adapt the persimmon-seed to be used in connection with the coffee-berry, and by which combination to produce a composite article which, although approximating to coffee in appearance and taste, shall have a marketable value much below it, or by the process hereinafter described to be used as a substitute for coffee.

With this view, I take the seed from the fruit, and, after cleansing it in some manner from extraneous matter, place it in or upon a receptacle, in or upon which it is, by the application of natural or artificial heat deprived of certain elements, such as moisture, essential oils, and other chemical bodies susceptible of being volatilized by different degrees of heat, and which seed at the same time is roasted, partially carbonized, or otherwise chemically changed so as to cause it to present the appearance with regard to color, or to produce the effect of, roasted coffee. This seed, after having been chemically changed, as described, can be ground or manipulated as coffee or sold in its entire state.

I claim as my invention—

The process of separating the seed of the persimmon, *Diospyros Virginiana*, from the pulp or fruity substance, cleansing it, partially carbonizing and fitting it to be reduced to minute particles, or used entire, as the base or constituent element of a beverage, substantially as set forth.

EDWD. DUGDALE.

Witnesses:
 JNO. M. HUFF,
 GEORGE W. HUMPHRIES.